Sept. 13, 1927.
A. STECKE
1,642,314
JOINT FOR WIRES AND WIRE ROPES
Filed March 10, 1923
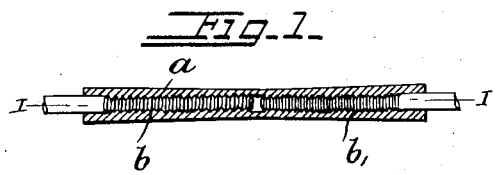
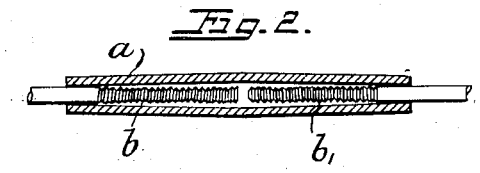
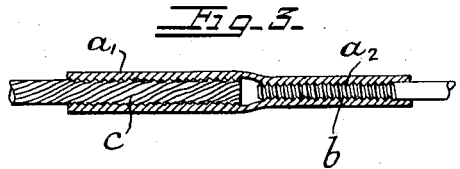
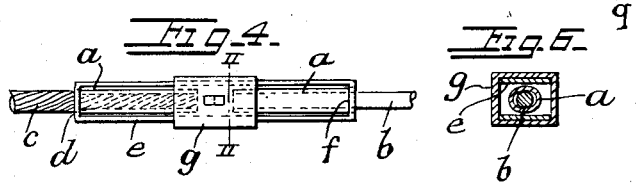
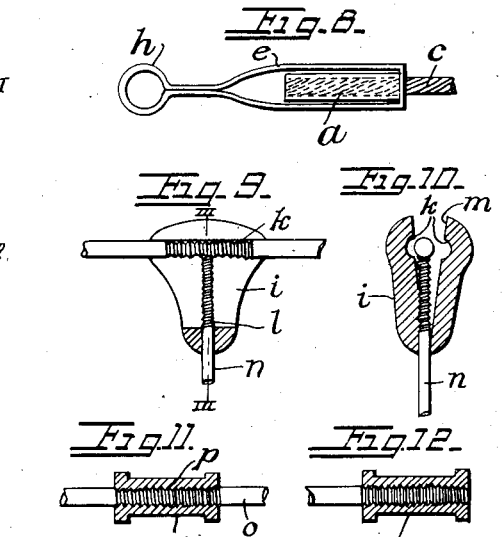
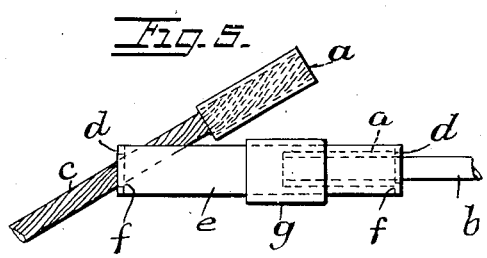
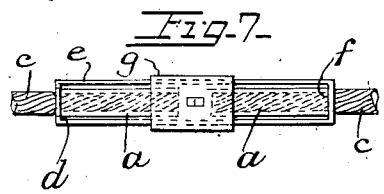
Inventor
Albert Stecke
by [signature]
Attorney · Patented Sept. 13, 1927.

1,642,314

UNITED STATES PATENT OFFICE.

ALBERT STECKE, OF OSNABRUCK, GERMANY.

JOINT FOR WIRES AND WIRE ROPES.

Application filed March 10, 1923, Serial No. 624,210, and in Germany March 13, 1922.

This invention relates to a joint for wires and wire ropes in which the ends to be joined are clamped in a double muff. Whilst up to the present the clamping was effected with the aid of conical roughened parts to be clamped which are clamped automatically in the conically tapered ends of the double muff when the wires or wire ropes were put under tension, this invention consists in that without the use of separate clamping elements the one of the wire ends or elements of the joint is forcibly pressed into the roughened or channeled surface of the other wire end or element of the joint.

This invention has for its object to effect rapidly a lasting joining of broken wires or wire ropes in railway locking frames in a simple and cheap manner.

The invention further presents the advantage that cross connections may be easily joined to continuous wires.

The special arrangement of the chasers is also new.

The invention may be executed in different manners, several embodiments of the same being shown by way of example on the accompanying drawing, wherein:

Fig. 1 shows in longitudinal section the joint for two wires.

Fig. 2 is a longitudinal section on line I—I of Fig. 1.

Fig. 3 shows in longitudinal section the joint of a wire rope and of a wire.

Fig. 4 shows another joint of wire rope and wire.

Fig. 5 shows in plan view the joint as shown in Fig. 4 in the position during the joining.

Fig. 6 is a section on line II—II of Fig. 4.

Fig. 7 shows the joint for two wire ropes.

Fig. 8 shows a joint element for attaching wire ropes on rope pulleys.

Fig. 9 shows in section a cross joint with a continuous wire.

Fig. 10 is a cross section on line III—III of Fig. 9.

Fig. 11 shows a continuous wire with thread groove cut open without pitch, the screw die being put in place.

Fig. 12 shows a wire end with screw die.

The joint in its most simple construction, shown in Figs. 1 and 2, consists of a muff $a$ which has a smooth boring. The ends of the two wires $b, b'$ are threaded but only for such a distance that the threaded parts of the two wire ends together are shorter than the muff $a$. After the wire ends to be joined have been inserted into the muff, the muff is compressed with the exception of its outer ends, so that the thread of the wire ends is pressed into the inner surface of the muff $a$ and the two wire ends are connected the one with the other in an absolutely secure manner.

Fig. 3 shows the joining of a wire rope and wire. Only the part $a'$ of the muff for the reception of the end of the wire rope is internally threaded, the other part $a^2$ of the muff having a smooth boring as the end $b$ of the wire is threaded. After the part $a'$ of the muff has been pushed over the end $c$ of the wire rope the internal threads of this part $a'$ are forcibly pressed into the end of the wire rope by strokes with a hammer so that a secure joining is produced.

According to Figs. 4, 5 and 6 the end of the wire rope $c$ and the end of the wire $b$ are introduced through holes $d$ at the ends of a joining body $e$, whereupon muffs $a$ are pushed over the ends of the wire rope and of the wire. The muff $a$ for the wire rope is internally threaded and the muff for the wire has a smooth boring, the wire end being threaded. After the muffs $a$ have been put in place they are securely fixed on the ends of the wire rope and wire by means of strokes of a hammer. When the joint is being put under tension these muffs $a$ bear against the inner faces $f$ of the element $e$. In order to prevent, in this form of construction, the muffs $a$ from getting out of the element $e$ if the tension decreases, a sleeve $g$ secured against displacement by a cotter or the like is pushed over the element $e$.

The form of construction shown in Fig. 7 illustrates the joining of two wire ropes according to the system illustrated in Fig. 4. The ends $c, c'$ of the wire ropes are introduced through the holes $d$ into the joining element $e$ and internally threaded muffs are pushed over the ends of the wire ropes. The muffs $a$ are prevented by means of a safety sleeve $g$ from getting out of the element $e$ when the tension decreases.

The joint shown in Fig. 8 shows how a wire rope $c$ is fixed in a joining element $e$ having a lug $h$ so that it can be attached by means of a screw or the like to a rope pulley or to a point's pulley. The end of the wire rope is inserted in a muff $a$ which is securely fixed upon the wire rope by being flattened by strokes of a hammer. The element $e$ of the joint is however only unilaterally arranged.

The wire joint shown in Figs. 9 and 10 serves for connecting a transverse wire with a continuous wire. The element $i$ has a longitudinal boring $k$ and a transverse boring $l$ standing perpendicularly to the boring $k$ and further an incision $m$ which is parallel with the longitudinal boring. The element $i$ of the joint can thus be mounted upon the continuous wire to be clamped on the same by being flattened by strokes of a hammer the transverse wire $n$ being clamped at the same time.

The transverse wire $n$ is inserted into the element $i$ of the joint so that it is in contact with the continuous wire. The parts of the wires to be joined are threaded, the threads are cut preferably only just before the joining is effected, the thread parts being so short that they are absolutely hidden in the joining element $i$. The continuous wire has a square thread and the threads on the wire $n$ become more shallow gradually from the front end to the rear.

Fig. 11 shows a continuous wire $o$ which, instead of being threaded has grooves $p$ without any pitch and which are cut open. The grooves get shallower from the middle towards the end. In Fig. 11 the screw die $q$ is shown.

Fig. 12 shows an end of a wire inserted in the screw die $q'$. The grooves $p$ without pitch are gradually shallower from the front end of the wire to the rear.

I claim:—

A connection for electric wires consisting of a frame-like open body having a hole in each end wall through which the threaded ends of the electric wires to be connected are inserted, a muff of comparatively soft material having a smooth inner surface pushed over each threaded wire end and flattened so that the material of each muff penetrates into and fills the threads in said wire ends, and a safety sleeve on said frame-like body into which safety sleeve the two muffs holding the threaded wire ends are to be inserted and convenient means for fixing said safety sleeve containing the muffs with the wire ends on the middle of said frame-like body.

In testimony whereof I affix my signature.

ALBERT STECKE.